April 16, 1940.         M. L. FORREST         2,197,210
CHAIN SAW
Filed April 1, 1938
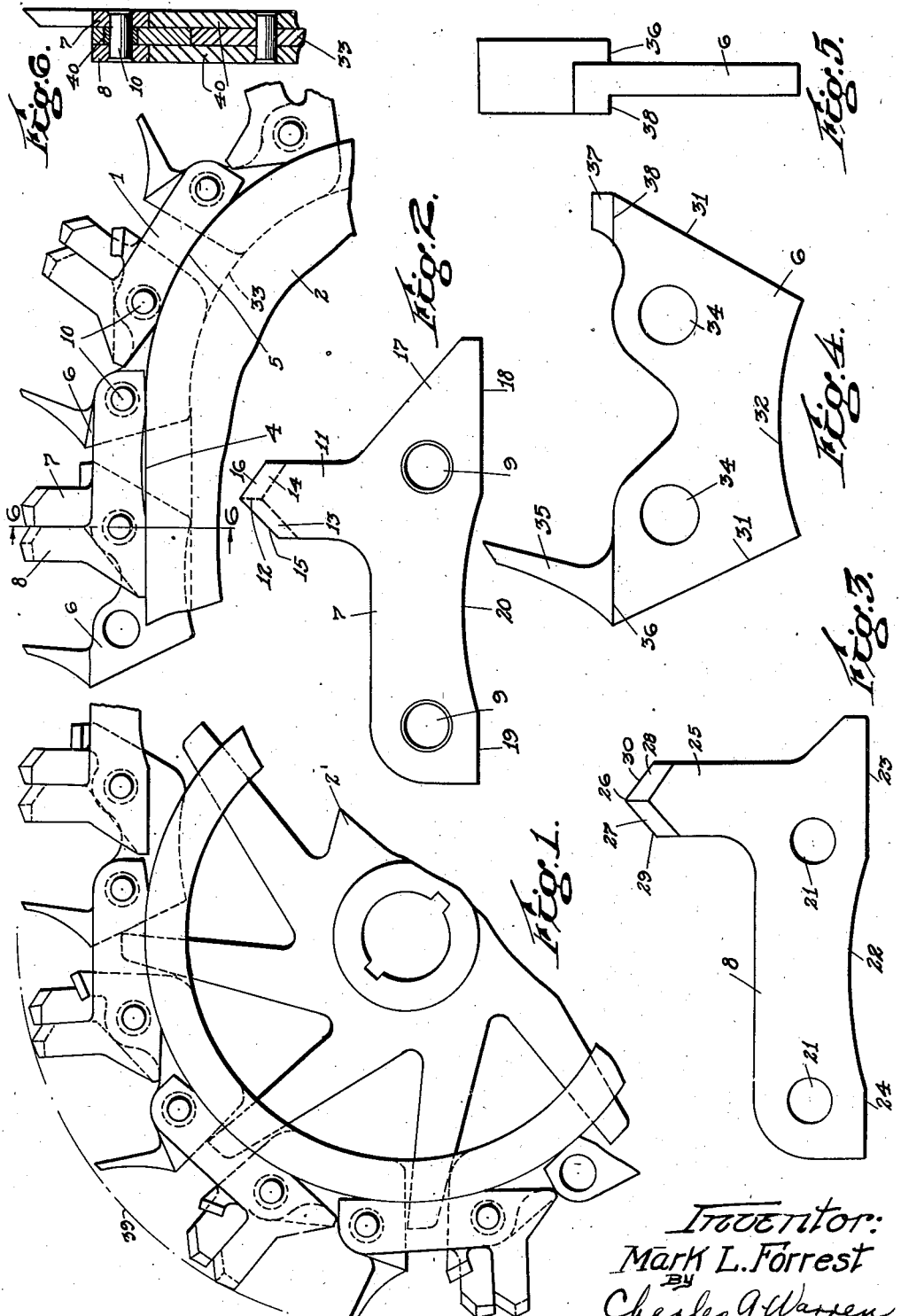
Inventor:
Mark L. Forrest
By
Charles A Warren
Attorney Patented Apr. 16, 1940

2,197,210

UNITED STATES PATENT OFFICE 2,197,210

CHAIN SAW

Mark L. Forrest, Portland, Oreg.

Application April 1, 1938, Serial No. 199,478

1 Claim. (Cl. 143—135)

The present invention relates to portable sawing machines, and particularly to the chain saw for use on this type of machine.

In prior devices of this character the chain has been frequently designed to be reversible and accordingly, a pair of raker teeth has been provided for each pair of cutting teeth with the raker teeth of each pair extending in opposite directions. Such a saw, because of the amount of space occupied by the pair of raker teeth, frequently clogs with sawdust, or the material removed in the sawing operation, so that it does not function properly, in certain instances, binding and causing destructive heating in the sawing machine. One of the principal objects of the present invention is to provide a simplified saw chain which will avoid any clogging and which can be driven without a substantial tension on the chain.

A further feature of the invention is in constructing the chain to prevent its flexing in one direction beyond a curvature equal to the point of least curvature on the guide plates over which the chain passes. By this arrangement the saw functions as a rigid blade and accordingly will perform the cutting operation rapidly and smoothly.

Other and further objects and advantages of the invention will appear from the following detailed description taken in connection with the accompanying drawing, in which—

Fig. 1 is a side elevation of a chain embodying the invention.

Fig. 2 is a side elevation of one of the links carrying a cutting tooth.

Fig. 3 is a side elevation of a link carrying the other cutting tooth.

Fig. 4 is a side elevation of the link carrying the raker teeth.

Fig. 5 is an end elevation of a link of Fig. 4.

Fig. 6 is a fragmentary sectional view along the line 6—6 of Fig. 1.

Like reference characters refer to like parts in the different figures.

With reference to Fig. 1, the saw chain 1 passes over a pair of spaced guide plates 2 forming a frame with which the outer links are engageable and around a drive sprocket 2' at one end of the plates. Obviously the complete plates are substantially elliptical so that the chain is continuous and each plate presents a portion 4 of minimum curvature and a portion 5 of maximum curvature at the end opposite to the sprocket. The structure for guiding and driving a saw chain of this character is well known and need not be described in detail as it is not a feature of the invention.

The invention resides in a saw chain which is made up of inner or drag links 6 connected by opposed outer or cutting links 7 and 8. The cutting link 7, as best shown in Fig. 2, has spaced openings 9 to receive the rivets 10, by which the links are connected together. The cutting link 7 has an upwardly extending portion 11 on the upper end of which is located the cutting point 12. The latter is formed by two opposed beveled surfaces 13 and 14, the former being positioned to define a cutting edge 15 making an angle of approximately 50° with a line connecting the two rivet holes. The beveled surface 14 is so positioned as to provide an edge 16 making an angle of approximately 25° with a line passing through the centers of the rivet holes and tapering from a substantial width, at the rearward edge of the tooth, to a point at the forward end or cutting point. It will be noted that the cutting tooth is located adjacent to the rearward end of the link, the chain moving in the direction of the arrow, Fig. 1.

The link has a rearwardly extending projection 17 which provides a flat underneath surface 18 to support the cutting tooth as the chain moves along the relatively flat portion of the guiding plates. A corresponding flat surface 19 is located adjacent the forward end of the link and between the surfaces 18 and 19 the lower edge of the link is arcuate, as at 20, to correspond to the maximum curvature of the guiding plates. The surfaces 18 and 19 which form a support for the link during the movement of the link over the relatively flat portions of the frame are so located that the rearward portion of the link, which has the greatest amount of wear, will have the greatest surface area, thereby minimizing both wear and friction.

With reference now to Fig. 3, the cutting link 8 has spaced openings 21 to receive the rivets by which the chain is held together. This link has an arcuate surface 22 corresponding to the arcuate surface 20 of the link 7 and substantially flat surfaces 23 and 24 corresponding to the surfaces 18 and 19. At its rearward end the link extends a substantial distance beyond the rearward rivet hole 21 to provide a relatively large bearing surface 23.

A projecting portion 25 on the link 8 has a cutting point 26 on the upper end thereof. The latter is formed by two opposed beveled surfaces 27 and 28, the former being positioned to define a cutting edge 29 which makes an angle of approximately 50° with a line connecting the two rivet holes. The beveled surface 28 is so positioned as to provide an edge 30 making an angle of approximately 25°, with a line passing through the centers of the rivet holes, and tapering from a substantial width, at the rearward edge of the tooth, to a point coinciding with the cutting point.

With reference to Fig. 1, it will be noted that the cutting point 12 is forward of the cutting point 26, with both points, however, located adjacent to the rearward ends of the corresponding links. By the location of the cutting teeth at these points there is less tendency for the forward ends of the links to rock upwardly away from the guide frame when the saw is in use, this rocking being further prevented by the long rearwardly extending surfaces 18 and 23.

The drag link 6, which connects adjacent pairs of cutting teeth, has opposed side edges 31, which, when the chain is located at the point of maximum curvature of the guide plates or the drive sprocket, are substantially parallel to the radii of the periphery of the plates. An inner edge surface 32 is curved to correspond to the curvature of a disk 33, which is positioned between the guide plates at the point of maximum curvature and has its center located at the center of curvature of the edges of the plates.

The drag link has spaced openings 34 to receive the rivet 10 by which the links are connected together, and at the rearward end of the drag link is an upwardly extending drag tooth 35, the forward edge of which makes an angle of substantially 85° with a line connecting the centers of the two rivet openings. This drag tooth is substantially wider than the main portion of the link, as shown in Fig. 5, and the upper edge of the link is ground, or otherwise formed, to extend at substantially an angle of 30° to a line connecting the centers of the openings 34 to define a cutting edge on the uppermost portion of the tooth.

The lower surfaces 36 of the drag tooth are flat and are accurately spaced from the center line of the openings 34 for engagement with the upper edges of the cutting teeth, as shown in Fig. 1, to prevent the saw, when the teeth are pivotally connected together, from bending beyond substantially a straight line, or, where the guide plates are curved throughout their entire periphery, from bending beyond a curvature equal to the point of least curvature on the guide plates.

The forward edge of the drag link has a laterally extending lug 37 having a flat undersurface 38, also accurately spaced from the center line of the openings 34 in the link for engagement with the cutting links, to cooperate with the surfaces 36 above referred to in preventing the chain saw from bending beyond the desired curvature in one direction.

The position of the end of the drag tooth is such that there is practically no tendency for the drag link to rock away from the proper position between the guide plates, the tooth being at the rearward end of the link, and since the tooth extends forwardly from adjacent the end of the link there is less tendency for the projecting end thereof to project beyond the arc defined by the cutting points of the cutting teeth as they pass around the end of the guide frame, this arc being represented by the dot-dash line 29 of Fig. 1. By proper location of the drag tooth in this way it is possible to utilize substantially the entire length of the saw in cutting so that trees having a diameter much greater than that of the length of the saw can be cut by manipulating the saw from one end and allowing the other end of the saw to project inwardly toward the center of the tree.

The saw above described is intended for use in any well known sawing machine of the type to which the saw is applicable, but for the purpose of obtaining most efficient performance of the saw it is adapted especially for use with a driving sprocket of the character shown in the copending Forrest application, Serial No. 199,479 filed April 1, 1938, in which is described and claimed the structure of the driving sprocket, together with the particular structure which makes the above described saw particularly applicable thereto. The drag links are spaced apart to receive between them the teeth on the sprocket as shown in Fig. 1, and the teeth extend between the links at least to a point in line with the centers of the rivets which pivotally connect the links together. It will be understood, as shown in Fig. 6, that a short sleeve 40 surrounds the central part of the rivet and this sleeve is slightly longer than the thickness of the drag link, so that the links when riveted together may pivot without binding. The outer ends of the rivet openings are countersunk, as shown, to permit the rivets to be secured to the links without projecting beyond the outer surfaces of the links.

I claim:

A saw chain comprising inner and outer links pivotally connected together, each inner link having a lug adjacent each end thereof engageable with edges of the outer links limiting the flexing of the chain in one direction beyond a predetermined curvature, said edges of the outer links engageable with the lugs being substantially parallel to the line of said predetermined curvature, the lug at one end of the inner link also forming a raker tooth.

MARK L. FORREST.